United States Patent [19]

Sakamoto

[11] Patent Number: 4,679,949
[45] Date of Patent: Jul. 14, 1987

[54] ELECTRONIC THERMOMETER

[75] Inventor: Tamaki Sakamoto, Kyoto, Japan

[73] Assignee: Omron Tateisi Electronics Co., Kyoto, Japan

[21] Appl. No.: 796,104

[22] Filed: Nov. 8, 1985

[30] Foreign Application Priority Data

Nov. 8, 1984 [JP] Japan .................. 59-234102
Nov. 9, 1984 [JP] Japan .................. 59-236187

[51] Int. Cl.⁴ .......................... G01K 1/14; G01K 3/00
[52] U.S. Cl. ................... 374/183; 338/22 R; 374/208; 374/102
[58] Field of Search ............... 374/208, 183; 73/431; 200/52 R; 338/22 R

[56] References Cited

U.S. PATENT DOCUMENTS

| | | | |
|---|---|---|---|
| 3,309,237 | 3/1967 | Kelchner et al. | 374/208 X |
| 3,343,402 | 9/1967 | Hubner | 73/23 |
| 3,427,862 | 2/1969 | Hubner | 73/23 |
| 3,824,860 | 7/1974 | Hardin | 73/431 |
| 4,107,489 | 8/1978 | Watanabe | 200/52 R |
| 4,371,271 | 2/1982 | Bellet | 374/208 X |
| 4,453,835 | 6/1984 | Clawson et al. | 374/208 X |
| 4,540,269 | 9/1985 | Nishiyama | 340/545 X |
| 4,565,456 | 1/1986 | Iida et al. | 374/170 X |
| 4,578,586 | 3/1986 | Preston | 73/431 X |

Primary Examiner—Daniel M. Yasich
Attorney, Agent, or Firm—Schwartz, Jeffery, Schwaab, Mack, Blumenthal & Evans

[57] ABSTRACT

An electronic thermometer in which a probe having a temperature sensor element disposed at a tip end portion and a planar terminal portion formed at a base end portion is employed for electronically measuring and displaying temperature on the basis of the characteristic of the temperature sensor element. The apparatus comprises a pair of members pivotally hinged together at one ends thereof so as to be selectively opened and closed about the hinged portion, and probe sandwiching means provided at the other ends of the members opposite to the hinged end for holding the terminal portion of the probe between the members in a sandwiched manner. The sandwiching means is provided with means for forming electric connection between the terminal portion and a temperature measuring and displaying circuit incorporated in the member.

12 Claims, 15 Drawing Figures

FIG. 5
FIG. 6
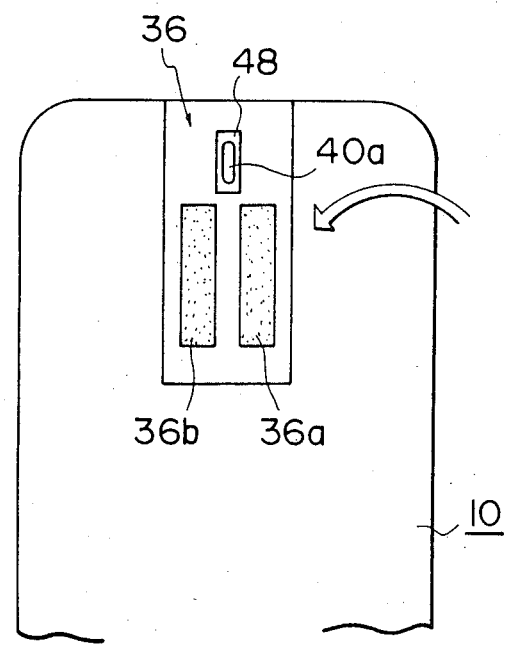
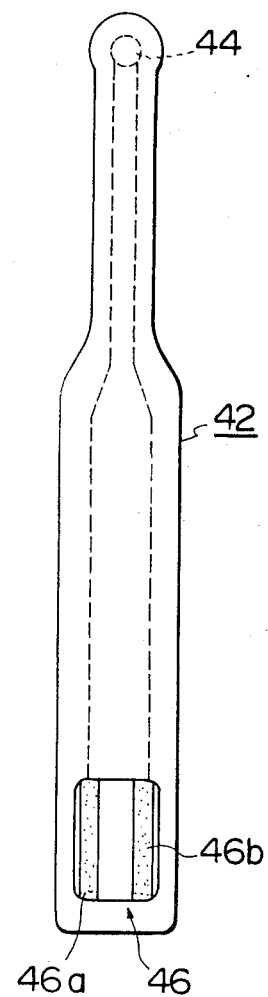

FIG. 7
FIG. 8
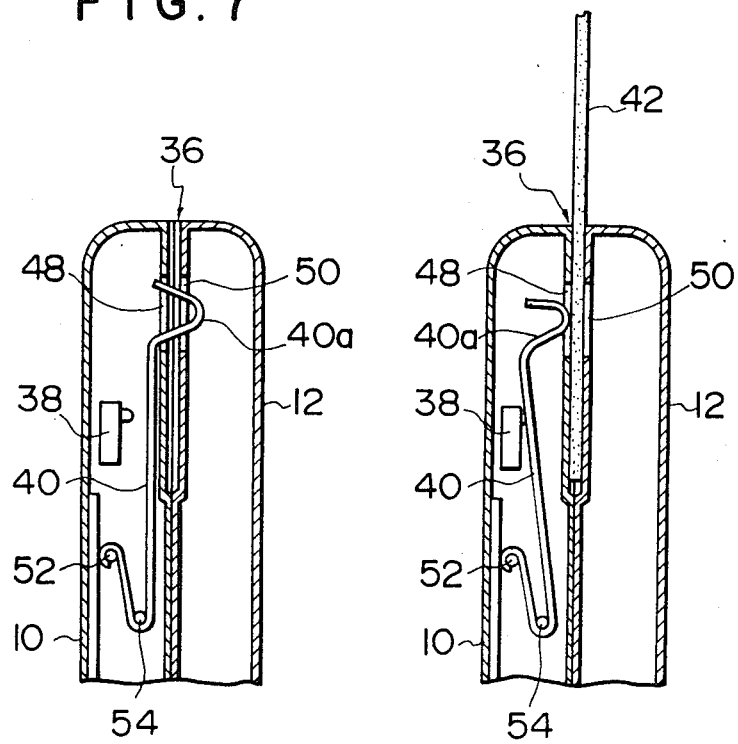
FIG. 9
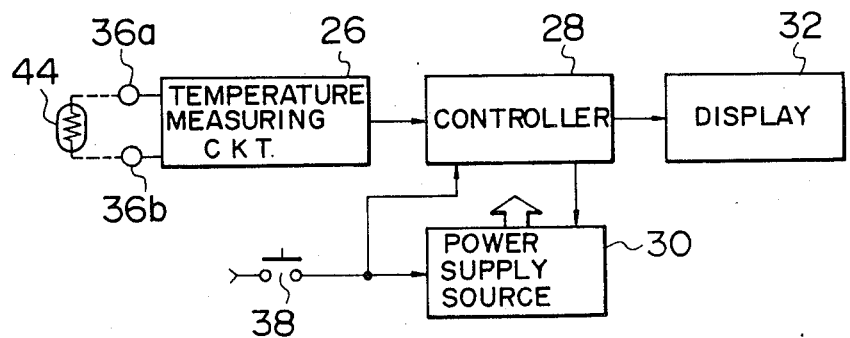

ELECTRONIC THERMOMETER

BACKGROUND OF THE INVENTION

1. Field of the Invention

The present invention relates generally to an electronic thermometer and particularly to an electronic thermometer intended for measurement of bodily temperature by using a disposable sheet-like probe.

2. Description of the Prior Art

Hitherto known electronic thermometer is typified by one disclosed in Japanese Patent Application Laid-Open No. 54422/1980 (date of application: July 3, 1978; Application No. 54-84348).

The sheet-like probe as employed is constituted by a paper sheet base coated with a plastic insulation film. The probe includes a temperature sensor element disposed at a tip end thereof and a terminal array provided at an enlarged bottom or base portion, wherein the temperature sensor element is electrically connected to the terminal array through suitable interconnection. Except for the portion where the terminal array is located, the sheet-like probe body is coated with the plastic film.

The electronic thermometer includes a pair of oppositely disposed members adapted to be selectively closed and opened to or from each other. The terminal array portion or the sheet-like probe is adapted to be held in a sandwiched manner between the paired members in the closed state thereof, wherein the terminal array is electrically connected to an internal temperature signal processing circuit.

By way of example, the sheet-like probes are given to a number of clients in a hospital. Each client places the probe within his or her mouth to bodily heat the probe. After a duration sufficient for heating up the probe has elapsed, operator or personnel carrying the electronic thermometer body measures sequentially the bodily temperatures of the individual clients. More specifically, the terminal array portion of the probe is sandwiced between the paired holding members in the state the probe is held in place in the client's mouth, and subsequently a switch for initiating the temperature measurement is actuated. Then the temperature measuring circuit is activated to arithmetically determine the temperature detected by the sensor element, the results thereof being displayed on a display unit in a digital form.

The conventional electronic thermometer is implemented in a configuration adapted to be held by a hand. More specifically, the electronic thermometer is composed of a grip portion of a size suited for being held by a hand, a fixed jaw, and a manipulating lever for manipulating the movable jaw. The probe holding or sandwiching means is constituted by the fixed and movable jaws. By opening and closing the fixed and movable jaws, the terminal array portion of the probe can be sandwiched between the jaws.

In the case of the electronic thermometer in which the temperature measuring operation is initiated by actuating the associated switch provided to this end (and simultaneously the display of the value measured immediately before is reset), there arises a problem that upon successive measurements of the bodily temperatures of a large number of clients, the measurement initiating switch must be manipulated every time the measurement is to be performed, involving time consuming and troublesome labor. Further, operator or nurse frequently forgets the pressing of switch in the state in which a new probe is inserted, giving rise to error in the reading of temperature, to a serious problem.

As an approach to solve the problem mentioned above, there has been known an electronic thermometer of such a structure in which upon connection of the probe between electrodes mounted on the probe holding members, the temperature measuring operation sequence is automatically initiated. However, this type thermometer suffers a difficulty that external noise acting on the electrode tends to trigger erroneously the temperature measuring sequence.

Besides, the hitherto known electronic thermometer is of a large size and difficult to operate. A major cause for the large size of the thermometer does not resides in the volume of the incorporated circuit but the design concept for allowing the thermometer to be held by hand. To this end, the grip is necessarily of a large size. Of course, addition of the movable and fixed jaws and the projection lever increases further the size and weight of the thermometer structure as a whole. Such thermometer can no more be placed in a plastron pocket.

In this connection, it is emperically known that the manipulatability can not be enhanced by increasing the size of the grip portion. Suppose that a client having the probe place in mouth will move to and fro, making thus it difficult for the personnel to place the probe correctly in the thermometer held by a hand of operator. In contrast, the fingers can inherently control the fine movements far better than the hand. The hitherto known thermometer of a large size adapted to be manipulated by hand suffers difficultly that it can not follow the fine movements of the objective to be measured.

Further, presentation of a large size thermometer immediately in front of a client will give discomfortableness to the latter.

SUMMARY OF THE INVENTION

In view of the drawbacks of the prior art instruments, it is an object of the invention to provide an electronic thermometer which is capable of automatically initiating a sequence of temperature measuring operations without need for manipulation of switch and which is substantially immune to the influences of external noise and thus assures a high reliability.

Another object of the invention is to provide an electronic thermometer which exhibits an improved manipulatability and is suited for manipulation of the probe by fingers, which thermometer can be implemented in a much reduced size with an improved aesthetic outer appearance so that it can be placed in a pocket of garment.

In view of the above objects, it is taught according to an aspect of the invention that a probe switch is provided which is operated only when the probe is correctly sandwiched between the paired holding members, wherein the sequence of the temperature measuring and displaying operations is initiated in response to the operation of the probe switch. Thus, the temperature measuring and displaying operation of the electronic thermometer can be automatically controlled in dependence on the attachment and detachment of the probe.

Since the temperature meauring operation can be initiated in response to the correct disposition of the terminal array portion of the probe between the paired members in the sandwiched manner without requiring troublesome switch manipulation, the electronic thermometer according to the invention can enjoy significantly improved manipulatability. Further, since the probe switch is adapted to be operated directly or indirectly by the probe, external noise provides no cause for erroneous operation, assuring thus an enhanced reliability.

In an embodiment of the invention, a pair of hollow plate-like members of a same symmetrical shape are pivotally connected to each other by means of hinge so as to be opened or closed relative to each other in a manner like a bivalve. The probe sandwiching portion is provided at the end opposite to the hinged end portion. In use, the paired members are closed toward each other by fingers with the probe being sandwiched between the free end portions of the paired members. Thus, the delicate manipulation of the electronic thermometer is assured to facilitate the sandwiching of the probe held by a man's mouth. Besides, the electronic thermometer can be realized in a very small size with a smooth outer appearance.

The above and other objects, features and advantages of the invention will be more apparent upon consideration of the following description of the preferred embodiments taken in conjunction with the accompanying drawings.

BRIEF DESCRIPTION OF THE DRAWINGS

FIG. 5 is a view showing in detail a probe sandwiching portion of the thermometer shown in FIG. 1;

FIG. 6 is a view showing a configuration of the probe adapted to be held in the sandwiched state by a main body of the electronic thermometer;

FIG. 7 is fragmentary sectional view showing a structure of a probe switch and associated parts of the thermometer according to the first embodiment in the state in which the probe is absent;

FIG. 8 is a view similar to FIG. 7 and shows the same in the state in which the probe is held in the sandwiched state;

FIG. 9 is a block diagram showing schematically a control unit incorporated in the thermometer according to the first embodiment;

DESCRIPTION OF THE PREFERRED EMBODIMENTS

FIGS. 1 to 10 are views showing an electronic thermometer according to a first embodiment of the present invention.

Referring to FIGS. 1 to 4, the electronic thermometer is composed of a front plate-like member 10 and a rear plate-like member 12 each having an elongated rectangular shape, wherein both members 10 and 12 are hinged, as indicated by 14, at one end thereof so as to be pivotally rotatable relative to each other in a manner like a bivalve. In the closed state, the opposite inner faces of the two members 10 and 12 are closely fitted to each other. In a preferred form of the invention, the front and rear members 10 and 12 may be formed of a plastic material integrally through a molding process with the interconnecting hinge 14 being realized in the form of a thin flexible film portion.

Figure 1:
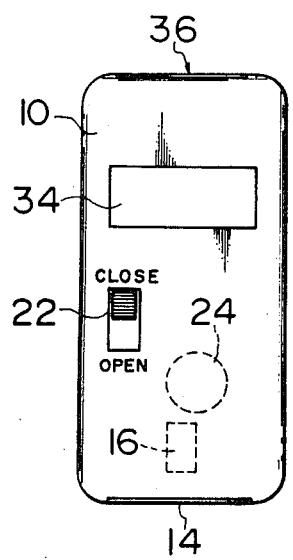
FIG. 1 is a front view of an electronic thermometer according to a first exemplary embodiment of the present invention.
Figure 2:
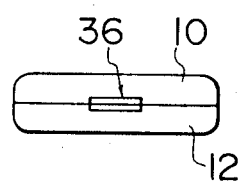
FIG. 2 is a plan view of the electronic thermometer shown in FIG. 1.
Figure 3:
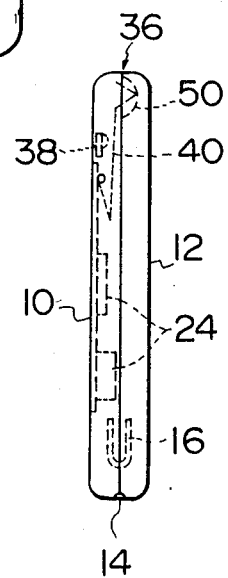
FIG. 3 is a side view showing the same in the closed state.
Figure 4:
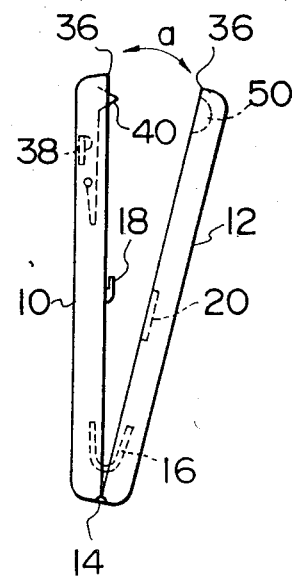
FIG. 4 is a view similar to FIG. 3 and shows the same in the open state.

As will be seen in FIGS. 3 and 4, the pair of members 10 and 12 are adapted to be opened and closed pivotally about the hinge portion 14 like a bivalve. A leaf spring 16 is mounted across the opposite faces of the members 10 and 12 so as to resiliently urge them toward the open position shown in FIG. 4. A locking claw 18 is integrally formed with the front plate-like member 10 and adapted to be removably engaged in a locking groove 20 formed in the rear member 12. When the locking claw 18 is engaged in the groove 20, the plate-like members 10 and 12 can be locked in the closed state, as shown in FIG. 3. The locking claw 18 is interlocked with a lock button 22 provided at the outer surface of the front member 10. When the lock button 22 is slideably moved from the position "CLOSE" to the position "OPEN", the locking claw 18 is disengaged from the locking groove 20, as the result of which both the plate-like members 10 and 12 are opened to a predetermined angle under the influence of the leaf spring 16.

A circuit element 24 (including a temperature measuring unit 26, a controller 28, a power supply source 30 and a display unit 32 shown in FIG. 9) implemented in the form of LSI is packaged interiorly of the front plate-like member 10, wherein a liquid crystal display 34 constituting a part of the display unit 32 is mounted on the outer surface of the front member 10.

Formed in the members 10 and 12 at the end opposite to the hinge 14 is a probe sandwiching portion 36 which is associated with a probe switch 38 and an actuator 40 both being incorporated in the front member 10.

FIG. 6 shows a probe 42 adapted to be used in the electronic thermometer according to the invention. The probe 42 is configured in a sheet-like structure including a base layer of paper sheet coated with a plastic film. A thermistor chip 44 is mounted on the tip portion of the probe, while a terminal portion 46 is provided at the base or enlarged portion of the probe 42. The terminal portion 46 includes a pair of exposed electrodes 46a and 46b juxtaposed in parallel with each other. The thermistor 44 itself as well as wiring interconnecting the thermistor and the electrodes 46a and 46b are coated with a plastic film.

Referring to FIG. 5, the proble sandwiching portion 36 provided on the inner surface of the front member 10 (i.e. the surface releasably joined to the inner surface of the counterpart member in the closed state includes a recess formed in the inner surface mentioned above and so dimensioned as to position securely the base portion of the probe 42. A pair of electrode pads 36a and 36b are disposed on the bottom of the recess 36 in parallel to each other. It should be noted that a similar recess and an electrode pad array are also provided symmetrically in the inner surface of the rear member 12.

In use, the base portion 46 of the probe 42 is placed in opposition to the sandwiching portion 36 of the front member 10 and subsequently both members 10 and 12 are closed to each other. In this state, the base portion 46 of the probe 42 is sandwiched under pressure between the portions 36 of the members 10 and 13, whereby the electrode pads 36a and 36b are caused to bear against the electrodes 46a and 46b, respectively. as a consequence, the thermistor 44 is electrically connected to the temperature measuring circuit 26.

Referring to FIGS. 7 and 8, slits 48 and 50 are formed, respectively, in the recesses of the members 10 and 12 in opposition to each other. A curvilinear tip portion 40a of the actuator 40 for the probe switch 38 is adapted to extend through the slits 48 and 50 in the closed state of the members 10 and 12.

More specifically, the actuator 40 is composed of a thin wire spring having a foot portion secured to pins 52 and 54 disposed within the front follow plate-like member 10, while the tip portion of the actuator 40 is located at the position of the slit 48. The spring force of the actuator 40 urges resiliently the tip portion 40a outwardly through and from the slit 48.

Referring to FIG. 7, when the members 10 and 12 are closed to each other at the absence of the probe 42, the tip portion 40a of the actuator 40 projecting through the slit 48 will engage in the slit 50 formed in the inner wall of the rear member 12. The position assumed by the actuator 40 in the state where the probe is not placed does not differ from the position taken by the actuator when both members 10 and 12 are opened. In this state, the actuator 40 exerts no pressure onto the button of the switch 38 which is thus at the opened position.

Referring to FIG. 8, when both members 10 and 12 are closed together in the state where the probe 42 is properly positioned at the sandwiching portion 36, the tip 40a of the actuator 40 bears against the probe 42, resulting in that the tip portion 40a is forced to retract inwardly from the slit 48, being attended by displacement of the actuator 40. This causes the button of the probe switch 38 to be pushed. In this manner, when the probe 42 is properly held in the sandwiched state, the probe switch 38 is automatically closed.

Referring to FIG. 9, a signal produced upon closing of the probe switch 38 is supplied to the controller 28 and the power supply source 30 which in turn responds thereto to thereby electrically activate the temperature measuring circuit 26, the controller 28 and the display unit 32.

Figure 10:
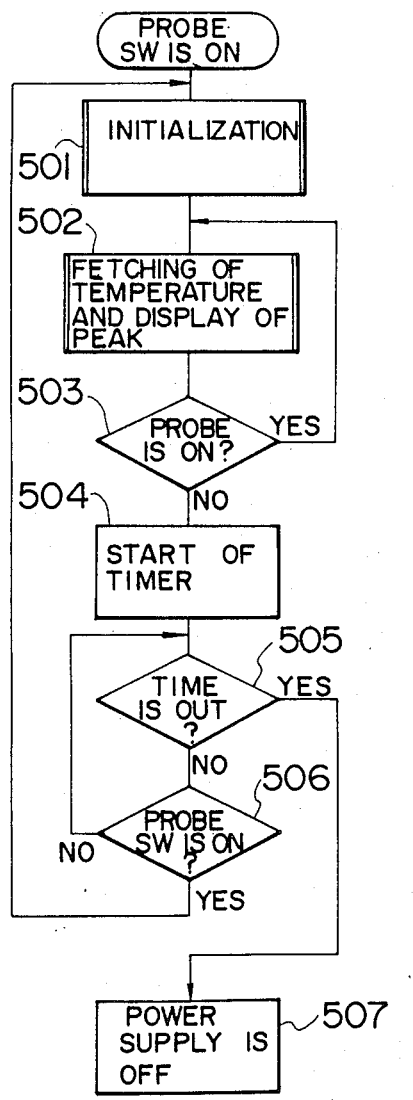
FIG. 10 is a flow chart for illustrating control operation of the electronic thermometer according to the first embodiment.

The controller 28 is adapted to perform the control illustrated in the flow chart shown in FIG. 10. At a first step 501, all the components are initialized. At a step 503, the state of the probe switch 38 is discriminated. So long as the probe switch 38 is closed (ON), the temperature measuring and displaying routine 502 can be repeated.

The temperature measuring circuit 26 serves to convert the resistance value of the thermistor 44 to a corresponding temperature value which is outputted in the form of a digital signal. Every time when the step 502 is executed, the controller 28 fetches the temperature signal from the temperature measuring circuit 26 and supplies to the display unit 32 the maximum value of the fetched temperature values to be displayed on the liquid crystal display 32 in the digital form.

Upon completion of the temperature measurement, the operator opens the members 10 and 12 to release the probe 42. Then, the probe switch 38 is opened. The control program proceeds to a step 504 from the step 503.

At the step 504, a timer set to a predetermined duration (e.g. 8 seconds) is activated. At a step 505, it is decided whether or not the time as set has expired. If not (NO), the state of the probe switch 38 is opened, whereby the step 505 is regained. In this state, the temperature (peak value) measured immediately before remains displayed at the display unit 34.

When a new probe 42 is inserted into the sandwiching portion 36 before the set time expires, the probe switch 38 is closed, resulting in a jump from the step 506 to the first step 501. Thus, all the components are reset to the initial state (the display 34 is also disabled), whereupon the temperature measuring and display routine is again initiated automatically.

On the other hand, when the set time has expired with the switch 38 remaining opened, a jump is made to a step 507 from the step 505, whereby the power supply from the source 30 is inhibited by a signal produced by the controller 28.

As will be appreciated from the foregoing description, the electronic thermometer according to the first embodiment of the invention allows a series of temperature mesurements simply by replacing successively a corresponding number of probes 42 without any need for switch manipulation.

Figure 11:
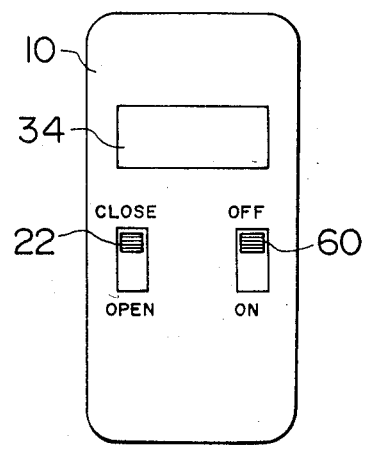
FIG. 11 is a front view of an electronic thermometer according to a second embodiment of the invention.
Figure 12:
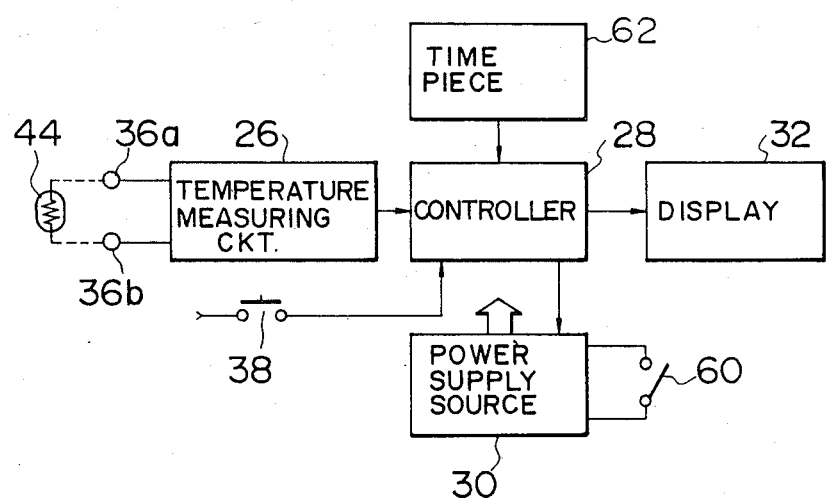
FIG. 12 is a block diagram showing schematically an arrangement of a control unit incorporated in the thermometer according to the second embodiment.
Figure 13:
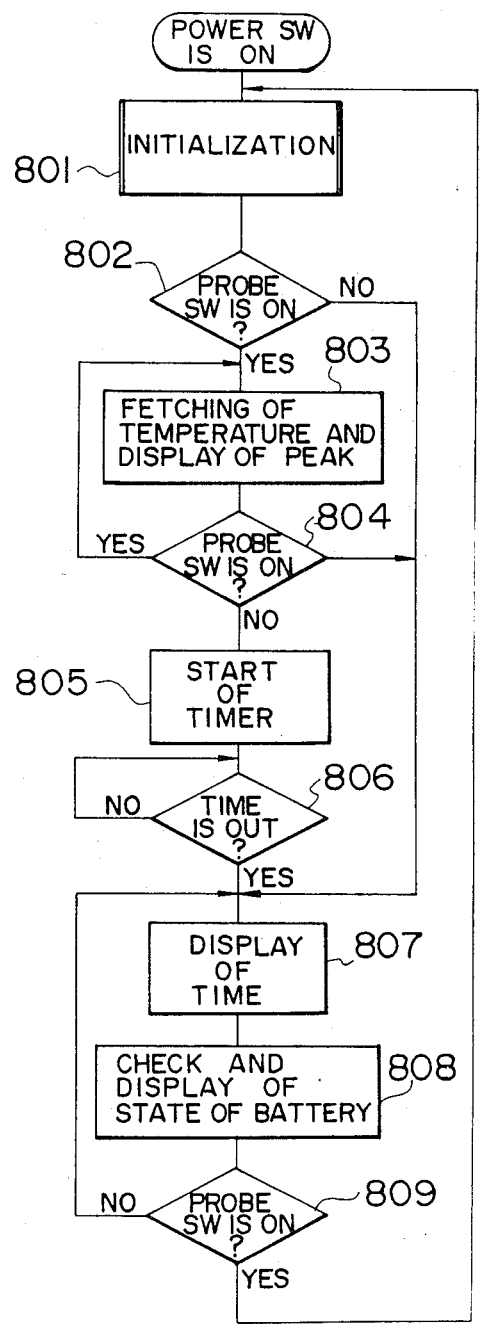
FIG. 13 is a flow chart for illustrating control operation of the thermometer according to the second embodiment.

FIGS. 11 to 13 shows a second exemplary embodiment of the invention. In the case of the second illustrative embodiment, a manual power on/off switch 60 is mounted on the outer surface of the member 10 in addition to the probe switch 38, as shown in FIG. 11. The power supply source 30 shown in FIG. 12 is closed or opened by correspondingly manipulating the power on/off switch 60. It should also be noted that a timepiece or timer 62 is provided which is electrically energized constantly independent of the closed or opened state of the power supply source 30. The timepiece 62 is adapted to produce a digital time indicating signal derived from crystal oscillation.

FIG. 13 shows a flow chart for illustrating the processing performed by the controller 28 shown in FIG. 12.

When the power on/off switch 60 is turned on, the controller 28 is activated to perform initialization processing at a step 801, being followed by a step 802 at which the state of the probe switch 28 is checked. When the probe switch 38 is opened because of absence of the probe 42, the controller 28 executes repeatedly the steps 807, 808 and 809. More specifically, the clock signal outputted from the timepiece 62 is supplied to the display unit 32 for allowing the time to be displayed digitally on the liquid crystal display field 34 (step 807). Further, the voltage level of the battery constituting the power supply source 30 is checked to display the state of the battery at the display field 34 in a symbolical manner (step 808). This operation is performed until the closed state of the switch 38 is detected at the step 809.

When the probe 42 is properly placed in the sandwiched state, the switch 38 is turned on, whereby the steps 809, 801, 802, 803 and 804 are successively executed in this order. In this manner, the temperature display routine 803 is repeated until the switch 38 is turned off. In other words, the peak value of the temperature detected by the temperature measuring curcuit 26 is displayed on the unit 34 while being updated.

When the probe switch 38 is opened, the timer is activated (805), resulting in that the thermometer is in the stand-by state with the temperature being continuously displayed, until the time set at the timer has expired (step 806), whereupon the steps 807, 808 and 809 are executed repeatedly.

It will be seen that when the probe switch 38 is opened, the timepiece mode and the battery check mode are realized. Upon closing of the probe switch 38, the temperature display mode operation is initiated.

In conjunction with the second embodiment, it should be noted that the time display mode and/or the battery check mode may be replaced by other operation modes. By way of example, information such as "Measurement is possible. Insert probe." may be displayed during this period. Further, the stand-by mode of a reduced power consumption may take place.

In both the first and second embodiments described above, the power supply to the components from the power supply source 30 is adapted to be switched on or off. However, the invention is not restricted to such circuit arrangement. By way of example, there may be adopted such arrangement in which the electric energy is constantly supplied to the individual components from the power supply source 30, wherein activation of the individual components is realized by switching on or off a reference clock signal supplied thereto. In the state where the supply of the reference clock signal is interrupted, the components are not activated, consuming substantially no power.

There is conceivable such a configuration of the probe in which the electrodes are each disposed in the exposed state on each surface of the base portion of the probe. In that case, the electrode pad may be each provided on each of the probe sandwiching portions of both the front and rear members 10 and 12, wherein electric connection between one electrode pad on one of the members 10 and 12 and the associated circuit disposed in the other member may be realized by using a flexible electric conductor which in turn may be disposed in the vicinity of the hinge portion 14 without presenting any obstacle to the opening/closing operation both members 10 and 12.

Further, the invention is not restricted to the arrangement that the operation sequence of the thermometer is triggerred by a signal produced by the probe switch 38. Other type of operation sequence may occur readily to those skilled in the art without departing from the scope of the invention.

In the case of the embodiment in which the power supply battery is disposed within the front member 10, a cover for allowing the replacement of the battery should preferably be provided at the inner surface thereof from the aesthetical viewpoint. In that case, it is preferred that both member 10 and 12 can be opened from each other to greater extent than that allowed by the leaf spring 16. An exemplary embodiment therefor is shown in FIG. 14.

Figure 14:
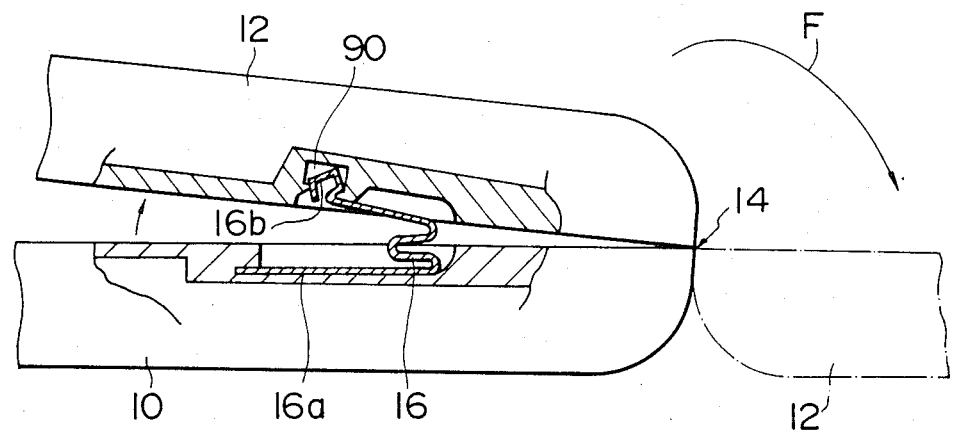
FIG. 14 is an fragmentary sectional view for illustrating another configuration of actuator employed in the electronic thermometer shown in FIG. 1.

In FIG. 14, the memers 10 and 12 are shown in the state opened to a predetermined angle under the action of the leaf spring 16. It will be seen that one end portion 16a of the leaf spring 16 is fixedly secured in the inner surface of the member 10. The other end portion 16b of the leaf spring 16 configured in an angular C-like shape is fitted within a recess 90 formed in the inner surface of the counterpart member 12. With this structure, the slightly forced opening of the rear member 14 in the direction indicated by an arrow F will dislodge the angular C-like end portion 16b of the leaf spring 16, allowing the member 12 to be opened to the position indicated by a dotted broken line. When both members 10 and 12 are closed together, the angular C-like end portion 16b is accommodated within the recess 90.

Figure 15:
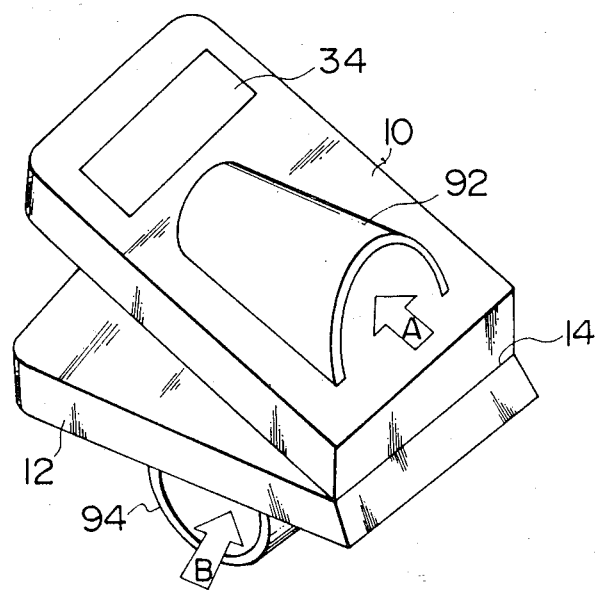
FIG. 15 is a perspective view showing an outer appearance of an electronic thermometer according to another embodiment of the invention.

FIG. 15 shows another embodiment of the invention. It will be seen that finger sleeves 92 and 94 are provided on the outer surfaces of the front and rear members 10 and 12, respectively. The finger sleeve 92 is adapted to receive therein the thumb of the left hand of the user in the direction indicated by an arrow A. On the other hand, the finger sleeve 94 is adapted to receive the forefinger of the left hand in the direction indicated by an arrow B. The finger sleeves 92 and 94 are oriented substantially orthogonally to each other for facilitating the insertion of the thumb and the forefinger.

The structure shown in FIG. 15 allows the thermometer to be manipulated only with the left hand, whereby manipulatability of the thermometer is significantly enhanced. It should be noted that in the case of this structure, the leaf spring for urging the members 10 and 12 to the open state may be spared.

In the foregoing, the present invention has been described in conjunction with the preferred embodiments. It should however be understood that numerous modifications and variations will reaily occur to those skilled in the art without departing from the spirit and scope of the invention.

What is claimed is:

1. An electronic thermometer for receiving a temperature probe having a temperature sensing means and a terminal portion, comprising:
    (a) means for holding the probe including a pair of probe holding members hingedly connected for pivotal movement from an open position to a closed position, whereby the probe is held between said two probe holding members;
    (b) a temperature measuring circuit on said holding means;
    (c) means for electrically connecting the terminal portion of the probe to said temperature sensing means and to the temperature measuring circuit;
    (d) probe switch means on said holding means;
    (e) means for operating said probe switch means only when the probe is held between said members in a predetermined manner;
    (f) means for displaying the temperature measured; and
    (g) control means for initiating said temperature measuring circuit upon the actuation of said switching means.

2. The electronic thermometer of claim 1 including an actuator for said switching means, said actuator actuating said switching means when a probe is inserted between said members.

3. The electronic thermometer of claim 2 wherein said members include aligned openings and a portion of said actuator extending through said openings when there is no probe between said members.

4. The electronic thermometer of claim 3 wherein said actuator cannot extend through said opening when a probe is inserted between said members, and wherein the terminal portion of the probe exerts a force on the actuator forcing said actuator in contact with said switching means.

5. The electronic thermometer of claim 1 wherein said control means includes a power supply source, said temperature measuring circuit, and said displaying means.

6. The electronic thermometer of claim 5 including a manual on/off switch and a timer circuit electrically independent of said on/off switch wherein a time display is displayed in response to closing said on/off switch.

7. An electronic thermometer comprising:
(a) a probe having a temperature sensing element disposed at one end thereof and a generally planar terminal portion formed at another end thereof;
(b) means for holding said probe including a pair of probe holding members hingedly connected for pivotal movement from an open position to a closed position, whereby said probe is held between said members;
(c) a pair of cooperating electrode means on said probe and on said holding means;
(d) temperature measuring means on said holding means, and said electrode means on said holding means being connected to said temperature measuring means;
(e) probe switch means on said holding means;
(f) means for cooperating said probe switch means only when the probe is held between said members in a predetermined manner;
(g) means for displaying the temperature measured; and
(h) control means for initiating said temperature measuring circuit upon the actuation of said switching means.

8. The electronic thermometer of claim 7 including actuator for said switching means, said actuator actuating said switching means when a probe is inserted between said members.

9. The electronic thermometer of claim 8 wherein said members include aligned openings and a portion of said actuator extending through said openings when there is no probe between said members.

10. The electronic thermometer of claim 9 wherein said actuator cannot extend through said opening when a probe is inserted between said members, and wherein the terminal portion of the probe exerts a force on the actuator forcing said actuator in contact with said switching means.

11. The electronic thermometer of claim 7 wherein said control means incudes a power supply source, said temperature measuring circuit, and said displaying means.

12. The electronic thermometer of claim 11 including a manual on/off switch and a timer circuit electrically independent of said on/off switch wherein a time display is displayed in response to closing said on/off switch.

* * * * *